(12) United States Patent
Yu

(10) Patent No.: US 10,364,612 B2
(45) Date of Patent: Jul. 30, 2019

(54) ROLLER CUTTING ELEMENT CONSTRUCTION

(71) Applicant: Smith International, Inc., Houston, TX (US)

(72) Inventor: Feng Yu, Provo, UT (US)

(73) Assignee: SMITH INTERNATIONAL, INC., Houston, TX (US)

(*) Notice: Subject to any disclaimer, the term of this patent is extended or adjusted under 35 U.S.C. 154(b) by 146 days.

(21) Appl. No.: 15/524,284

(22) PCT Filed: Nov. 6, 2015

(86) PCT No.: PCT/US2015/059374
§ 371 (c)(1),
(2) Date: May 4, 2017

(87) PCT Pub. No.: WO2016/073809
PCT Pub. Date: May 12, 2016

(65) Prior Publication Data
US 2017/0335633 A1 Nov. 23, 2017

Related U.S. Application Data

(60) Provisional application No. 62/075,968, filed on Nov. 6, 2014.

(51) Int. Cl.
*E21B 10/573* (2006.01)
*E21B 10/633* (2006.01)
(Continued)

(52) U.S. Cl.
CPC .............. *E21B 10/55* (2013.01); *B01J 3/062* (2013.01); *B23P 15/28* (2013.01); *E21B 10/003* (2013.01);
(Continued)

(58) Field of Classification Search
CPC ........ E21B 10/52; E21B 10/55; E21B 10/567; E21B 10/573; E21B 10/5735;
(Continued)

(56) References Cited

U.S. PATENT DOCUMENTS 4,553,615 A * 11/1985 Grainger ................. E21B 10/12
175/354
5,799,741 A * 9/1998 Kosobrodov ......... E21B 10/006
175/350
(Continued)

FOREIGN PATENT DOCUMENTS

WO WO2010117834 A1 10/2010

OTHER PUBLICATIONS

International Search Report and Written Opinion issued in corresponding International Application PCT/US2015/059374 dated Jan. 29, 2019. 18 pages.

*Primary Examiner* — Kenneth L Thompson

(57) ABSTRACT

Roller cutters comprise a diamond-bonded body joined to an infiltration substrate. An extension is joined to the substrate and includes first section having a diameter sized the same as the substrate, and an integral second section having a diameter smaller than the substrate. The extension is joined to the substrate during an HPHT process. The first section has a thickness greater than that of the infiltration substrate. The second section has an axial length greater than the combined thickness of the substrate and the first section. The extension has a strength and/or toughness greater than the substrate as a result of its material composition, e.g., the amount of binder phase material and/or the size of hard phase material. The roller cutter is rotatably disposed within a pocket internal cavity, wherein the pocket is attached to a drill bit.

19 Claims, 5 Drawing Sheets

(51) Int. Cl.
*E21B 10/55* (2006.01)
*E21B 10/567* (2006.01)
*B01J 3/06* (2006.01)
*B23P 15/28* (2006.01)
*E21B 10/00* (2006.01)
*E21B 10/62* (2006.01)

(52) U.S. Cl.
CPC ............ *E21B 10/567* (2013.01); *E21B 10/62* (2013.01); *E21B 10/633* (2013.01); *B01J 2203/0655* (2013.01); *B01J 2203/0685* (2013.01)

(58) Field of Classification Search
CPC ................. E21B 10/627; E21B 10/633; E21B 2010/545; E21B 2010/561; E21B 2010/564; E21B 2010/565; E21B 2010/622; E21B 2010/624
See application file for complete search history.

(56) References Cited

U.S. PATENT DOCUMENTS

| | | | | |
|---|---|---|---|---|
| 7,762,359 | B1* | 7/2010 | Miess | E21B 10/633 |
| | | | | 175/354 |
| 8,011,456 | B2* | 9/2011 | Sherwood, Jr. | E21B 10/633 |
| | | | | 175/368 |
| 8,286,735 | B1* | 10/2012 | Cooley | E21B 10/55 |
| | | | | 175/382 |
| 8,950,516 | B2* | 2/2015 | Newman | E21B 10/62 |
| | | | | 175/383 |
| 9,187,962 | B2* | 11/2015 | Burhan | E21B 10/54 |
| 9,322,219 | B2* | 4/2016 | Burhan | E21B 10/46 |
| 9,803,427 | B1* | 10/2017 | Cooley | E21B 10/62 |
| 2008/0179109 | A1 | 7/2008 | Belnap et al. | |
| 2011/0083908 | A1 | 4/2011 | Shen et al. | |
| 2011/0297454 | A1 | 12/2011 | Shen et al. | |
| 2014/0069725 | A1 | 3/2014 | Yu et al. | |
| 2014/0131118 | A1 | 5/2014 | Chen et al. | |
| 2014/0174834 | A1* | 6/2014 | Zhang | E21B 10/573 |
| | | | | 175/432 |

\* cited by examiner

ROLLER CUTTING ELEMENT CONSTRUCTION

CROSS REFERENCE

This application claims the benefit of U.S. Application No. 62/075,968, entitled "ROLLER CUTTING ELEMENT CONSTRUCTION," filed Nov. 6, 2014, the disclosure of which is hereby incorporated herein by reference.

BACKGROUND

The use of roller cutting elements comprising ultra-hard constructions including a body, formed from ultra-hard materials such as diamond, polycrystalline diamond (PCD), cubic boron nitride (cBN), polycrystalline cubic boron nitride (PcBN), and a carbide substrate are well known in the art. An example of such known roller cutting element is one where the ultra-hard construction comprises a PCD body that is joined together with a carbide substrate. Such rolling cutter further includes an extension that is brazed onto the carbide substrate, and that extends a desired distance away from the ultra-hard construction. The extension is configured to fit within a pocket of a drilling tool such as a drill bit in a manner that permits the ultra-hard construction to rotate within the pocket during drill bit use.

Such conventional roller cutting elements may fail or otherwise have a compromised service life due to reduced strength and/or toughness when placed into drill bit service. It is, therefore, desired that roller cutting elements be developed in a manner that provide an increased level of strength and/or toughness when compared to conventional roller cutting elements, thereby increasing the effective service life of the same. It is also desired that such roller cutting elements be provided in a manner that does not sacrifice desired properties of the ultra-hard construction, such as wear resistance and/or abrasion resistance. It is still further desired that such roller cutting elements be manufactured in a manner that is efficient and does not involve the use of exotic materials and/or techniques.

SUMMARY

Roller cutting elements as disclosed herein include an infiltration substrate sandwiched between a diamond-body and an extension having increased strength and/or toughness as compared to the infiltration substrate. The diamond body includes a matrix phase of intercrystalline bonded diamond and a plurality of interstitial regions dispersed within the matrix phase. The extension has a first section having a diameter that is the same as the diameter of the infiltration substrate, and a second section having a diameter sized less than the diameter of the infiltration substrate, where the second section is integral with the first section. The extension may be joined with the infiltration substrate during a single HPHT process used to sinter the diamond body, or during a subsequent HPHT process after the diamond body has been sintered. In an example, the extension's first section has an axial thickness greater than that of the infiltration substrate. In an example, the extension's second section has an axial length that is greater than the combined thickness of the infiltration substrate and the extension's first section.

In an example, the infiltration substrate and the extension are formed from a material that includes metallic materials, ceramic materials, cermet materials, and combinations of the same, wherein the extension and the infiltration substrate each comprise a hard phase material and a binder phase material. In an example, both the infiltration substrate and extension are formed from WC—Co. In an example, the amount of the binder phase material and/or the grain size of the hard phase material can be selected so that the extension displays properties of toughness and/or strength that are different, e.g., greater, than that of the infiltration substrate. In an example, the extension may have increased toughness, when compared to the infiltration substrate, by having a relatively higher amount of binder phase material and/or by using relatively coarser-sized hard phase grains than that of the infiltration substrate. In an example, the extension may have increased strength, when compared to the infiltration substrate, by using a hard phase material having relatively smaller-sized hard phase grains than that of the infiltration substrate.

The second section of the roller cutting element's extension may be disposed within an internal cavity of a sleeve that is fixedly attached to a drill bit. The roller cutter is attached within the internal cavity to permit the roller cutting element to rotate during operation of the drill bit to permit different areas of the roller cutter element wear surface to engage a subterranean formation during a drilling operation.

This summary is provided to introduce a selection of concepts that are further described below in the detailed description. This summary is not intended to identify key or essential features of the claimed subject matter, nor is it intended to be used as an aid in limiting the scope of the claimed subject matter

BRIEF DESCRIPTION OF THE DRAWINGS

These and other features and advantages of roller cutting elements as disclosed herein will be appreciated as the same becomes better understood by reference to the following detailed description when considered in connection with the accompanying drawings wherein.

DETAILED DESCRIPTION

Roller cutting elements or roller cutters as disclosed herein include an ultra-hard body formed from an ultra-hard material such as polycrystalline diamond (PCD) or the like, an infiltration substrate joined to the body, and an extension joined to and extending a distance from the substrate, wherein the extension may be joined to the substrate during a single high pressure/high temperature (HPHT) process used to sinter the PCD body, or during a subsequent HPHT process. The extension has a first section having a diameter equal to the diameter of the infiltration substrate, and includes a second section having a diameter sized less than that of the infiltration substrate. In an embodiment, the second section of the extension is sized so as to fit within a pocket, sleeve, or cavity attached to or disposed within a drilling tool to enable rotatable movement of the roller cutter during use. The extension is formed from a material capable of providing the roller cutter with improved properties of toughness and/or strength, thereby serving to increase the effective service life of the roller cutter and drilling tool comprising the same.

Figure 1:
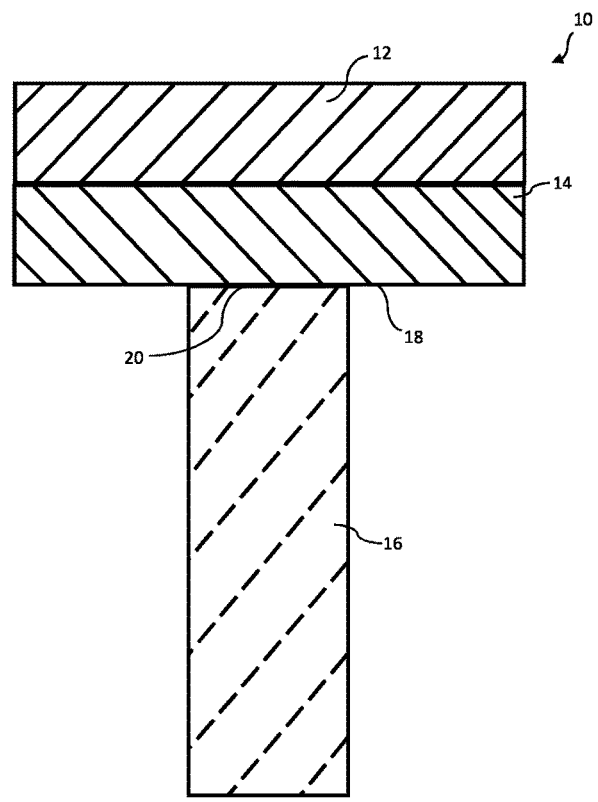
FIG. 1 is a cross-sectional side view of a prior art roller cutter.
Figure 2:
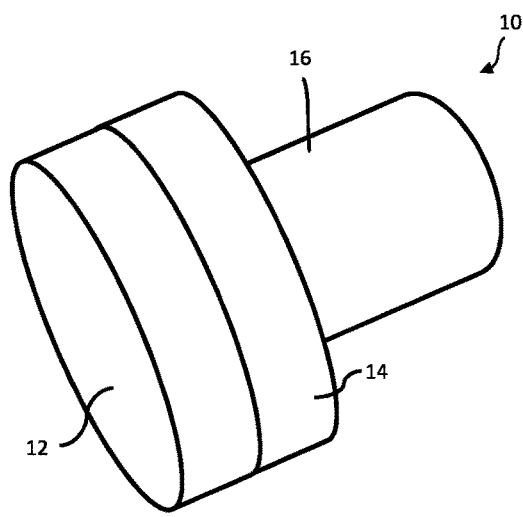
FIG. 2 is perspective side view of a prior art roller cutter.

FIGS. 1 and 2 illustrate prior art roller cutting elements or roller cutters 10, comprising a PCD body 12, a substrate 14, and an extension 16. The PCD body 12 is formed, and the substrate 14 is attached to the body, during an HPHT process used to sinter the PCD body. The so-formed compact comprising the PCD body attached to a substrate is then, once removed from the HPHT processing device, prepared for subsequent attachment of the extension 16 thereto. The extension 16 has a diameter that is less than that of the substrate 14, and is attached to an underside surface 18 of the substrate 14 by a welding or brazing process after the compact is formed. During use, large loads are placed on the cutter at the attachment point or interface 20 between the extension 16 and substrate 14. This attachment point is characterized by both having a high residual stress (resulting from the braze or weld attachment process), and having a relatively small attachment surface area, i.e., that is defined by the smaller diameter of the extension. The combination of these two elements operate to make the extension-substrate interface a weak point for such prior art roller cutters that may be prone to failure, thereby reducing the effective service life of the roller cutter and the drilling tools using the same.

Figure 3:
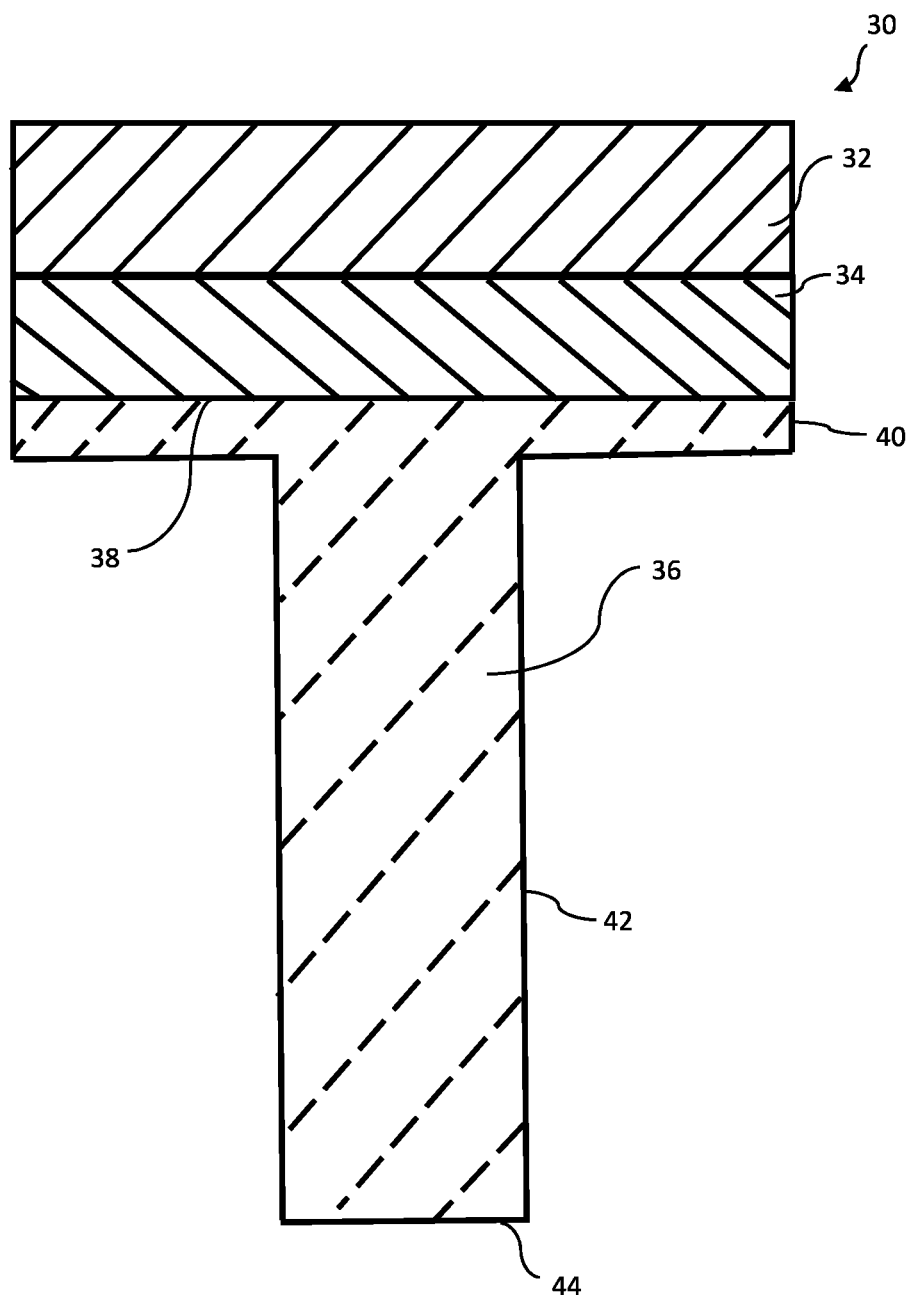
FIG. 3 is a cross-sectional side view of an example roller cutter as disclosed herein.

FIG. 3 illustrates an example roller cutter 30 made according to principles and methods disclosed herein. The roller cutter 30 comprises a body 32, an infiltration substrate 34 joined to the body 32, and an extension 36 joined to and extending a distance from the infiltration substrate 34. Body 32 has a working surface that may be the top and/or side surfaces of the body depending on the particular end-use application. Additionally, the body 32 may have a chamfered or beveled edge between the top and side surfaces if so desired.

In an embodiment, the body 32 is PCD. PCD is an ultra-hard material formed by subjecting a volume of diamond grains to HPHT conditions in the presence of a catalyst material. The catalyst material may be a solvent catalyst metal, such as one or more selected from Group VIII of the Periodic table. As used herein, the term "catalyst material" refers to the material initially used to facilitate diamond-to-diamond bonding or sintering during the HPHT conditions used to form the PCD. PCD has a material microstructure comprising a matrix phase of intercrystalline bonded diamond, and a plurality of interstitial regions dispersed within the matrix phase, wherein the catalyst material is disposed within the interstitial regions. In an embodiment, the catalyst material is from 9 to 15% by weight of the PCD material.

In another embodiment, the body 32 is thermally stable polycrystalline diamond (TSP), which is formed by removing the catalyst material from PCD, so that a portion of or all of the diamond body 32 is substantially free of the catalyst material. TSP has a material microstructure characterized by a matrix phase of intercrystalline bonded diamond, and a plurality of empty interstitial regions. If desired, the empty interstitial regions may be filled with a desired replacement or infiltrant material as described below. Alternatively, TSP may comprise the catalyst material that has been treated or that otherwise exists in a state that prevents it from acting in a catalytic manner when the diamond body is subjected to high temperature conditions. TSP may also include diamond grains sintered using non-metallic thermally stable solvent catalysts such as carbonates, oxides, and sulfides. TSP may also be 100% diamond material synthesized with CVD or directly synthesized from graphitic sources. Thus, the ultra-hard body as used with roller cutters as disclosed herein may comprise entirely TSP, or may comprise a region of TSP and a remaining region of PCD, e.g., wherein the region of TSP may be positioned along a wear surface and the PCD may be positioned adjacent a substrate joined with the diamond-bonded body.

It is to be understood that the body 32 may be formed from ultra-hard materials other than diamond-bonded materials such as PCD. As used herein, the term "ultra-hard" is understood to refer to those materials known in the art to have a grain hardness of about 4,000 HV or greater. Such ultra-hard materials may include those capable of demonstrating physical stability at temperatures above about 750° C., and for certain applications above about 1,000° C., that are formed from consolidated materials. Such ultra-hard materials may include but are not limited to diamond, cubic boron nitride (cBN), diamond-like carbon, boron suboxide, aluminum manganese boride, and other materials in the boron-nitrogen-carbon phase diagram which have shown hardness values similar to cBN and other ceramic materials.

The PCD body 32 is joined or bonded with an infiltration substrate 34 that has the same diameter as the PCD body 32. Substrate materials useful for serving as the infiltration substrate 34 include those conventionally used for infiltrating and forming PCD materials, which include metallic materials, ceramic materials, cermet materials, and combinations thereof. Example infiltration substrates 34 may be formed from hard materials like carbides such as WC, $W_2C$, TiC, VC, or ultra-hard materials such as synthetic diamond, natural diamond and the like, wherein the hard or ultra-hard materials may include a softer binder phase comprising one or more Group VIII materials such as Co, Ni, Fe, and Cu, and combinations thereof. A feature of such infiltration substrate 34 is that prior to sintering it has a material composition calculated to release a desired amount of binder phase material and infiltrate into the diamond powder during the HPHT process to sinter the PCD body 32.

In an example embodiment, the infiltration substrate 34 may be formed from WC—Co comprising a WC hard material with a particle size greater than about 1 micron, and in the range of from about 1 to 5 microns, and having a Co content greater than about 9 percent by weight. In an embodiment, the infiltration substrate 34 has a Co content from about 12 to 14 percent by weight based on the total weight of the WC—Co material. In another embodiment, the infiltration substrate 34 is formed from WC—Co comprising a WC particle size of about 3 microns and having a Co content of about 13 percent by weight prior to sintering of the diamond body. In yet another embodiment, the infiltration substrate 34 is provided in the form of a consolidated solid for use in sintering the diamond-bonded body 32 during the HPHT process.

The roller cutter 30 further comprises an extension 36 that is joined or bonded with the infiltration substrate 34. The extension 36 is specially engineered to both provide a strong attachment bond with the infiltration substrate 34 during an HPHT process, and to provide an improved degree of strength and/or toughness to the roller cutter 30 when it is placed into an end-use service. Materials useful for serving as the extension 36 include metallic materials, ceramic materials, cermet materials, and combinations thereof. Example extensions 36 as disclosed herein include those formed from hard materials like carbides such as WC, $W_2C$, TiC, VC, or ultra-hard materials such as synthetic diamond, natural diamond and the like, wherein the hard or ultra-hard materials may include a softer binder phase comprising one or more Group VIII material such as Co, Ni, Fe, and Cu, and combinations thereof.

The extension 36 is joined together with the infiltration substrate 34 either during the same HPHT process used to sinter the PCD body 32 or during a subsequent HPHT process after the PCD body 32 has been sintered. In an example embodiment, the extension 36 is sized having a diameter at an interface or attachment point 38 with the infiltration substrate that is the same as the diameter of the infiltration substrate 34. This feature of a common substrate interface diameter, or common substrate attachment surface area, operates in conjunction with the HPHT bonding and the reduced residual stress (resulting from the same and the compatible infiltration substrate and extension material compositions) to provide a roller cutter having a high level of bonding strength at the attachment point in addition to the high levels of strength and/or toughness provided by the extension itself.

The extension 36 comprises a first section 40 that as noted above is the same diameter as the infiltration substrate, and that extends axially away for a desired length from the interface 38 with the infiltration substrate 34. In an example, it is desired that the axial length of the first section 40 of the extension 36 be sufficient so as to place a majority of the load of the roller cutter on a portion of the extension 36 that is not the interface. In an example, the first section 40 has an axial length that is about 25 percent or more, and in the range of from about 25 to 75 percent, of the combined thickness of first section 40 of the extension 36, the PCD body 32, and the infiltration substrate 34. In an example embodiment, where the diameter of the roller cutter 30 is approximately 13 mm, the axial length of the first section 40 of the extension 36 is approximately 8 mm. Functionally, the first section 40 has an axial thickness to ensure that the substrate interface 38 is positioned a sufficient distance from an second section 42 of the extension 36 so as to not be subjected to the large amount of loading stresses that may be imposed onto the second section 42 during end-use application.

Moving away from the first diameter section 40, the extension 36 comprises a second section 42 that extends axially from the first section 40 to a base or bottom surface 44 of the extension 36. In an example, the second section 42 is sized smaller than that of the first section 40, and is configured to be rotatably disposed within a pocket or sleeve attached to a drilling tool to facilitate rolling or rotary movement of the roller cutter therein during use. The size of the second section 42 will vary depending on the size of the roller cutter 30 and the end-use application. It is desired that the second section 42 have a diameter that is sufficient, in conjunction with the material of construction, to provide the desired degree of strength and/or toughness to withstand the loads placed upon the roller cutter when placed into an end-use application.

In an example, the second section 42 may have a diameter that is about 75 percent or less, for example between about 70 and 40 percent or between about 60 to 50 percent, than that of the first section 40. In an example, the first section 40 has an axial length of greater than about 2 mm, in the range of about 4 to 10 mm or, in another embodiment, in the range of about 5 to 8 mm. In an example where the roller cutter diameter is approximately 13 mm, the second section 42 is approximately 8 mm.

The second section 42 has an axial length extending from the first diameter section 40 to the base 44 that is sized to fit with a respective pocket or sleeve of a drilling tool. In an example, it is desired that the axial length of the second section 42 be sufficient so as to provide a desired rotational movement of the roller cutter 30 relative to the pocket without binding due to the loads put on the roller cutter when placed into use. In an example, the axial length of the second section 42 can and will vary depending on the end-use application. In an example embodiment, the second section 42 has an axial length greater than about 5 mm, in the range of from about 8 to 25 mm or, in another embodiment, from about 10 to 15 mm. In an example where the roller cutter diameter is approximately 13 mm, the axial length of the second section 42 is approximately 11 mm.

Figure 4:
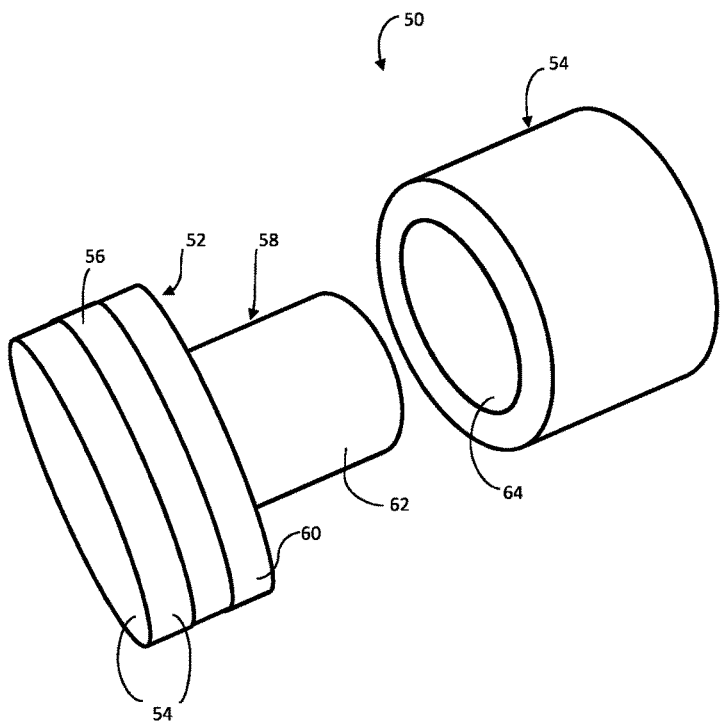
FIG. 4 is an exploded perspective side view of an example roller cutter as disclosed herein and a housing or sleeve for accommodating the same.

FIG. 4 illustrates an assembly 50 comprising a roller cutter 52 positioned adjacent a pocket or sleeve 54 as disclosed herein. Specifically, the roller cutter 52 is configured as disclosed above with reference to FIG. 3, comprising a PCD body 54 that is bonded together with an infiltration substrate 56, and comprising an extension 58 that is bonded together with the infiltration substrate 56, wherein the PCD body is formed and the infiltration substrate and extension are all bonded together during the same HPHT process, or wherein the extension is attached during a second HPHT process after formation of the PCD body. The extension 58 comprises the first and second sections 60 and 62 as disclosed above, and the first section 60 has an interface diameter or surface area that is the same as the infiltration substrate 56.

The pocket or sleeve 54 may be formed from a metallic material suitable for both accommodating the roller cutter 52 within an internal cavity 64 to facilitate rolling or rotating movement of the roller cutter therein during use, and for attaching with a desired end use device such as a drilling tool. In an example, the sleeve 54 is formed from a carbide material, and the internal cavity 64 is sized to accommodate placement of the second section 62 therein while providing sufficient clearance to permit rotational movement of the rolling cutter therein. In an example, the sleeve pocket is sized having an axial depth sufficient to accommodate placement of substantially all of the second section 62 therein. The roller cutter and sleeve assembly may include a retaining ring or element disposed within the cavity 64 and that is interposed between the second section 62 and the cavity 64 to retain the roller cutter 50 therein while also permitting rotational movement of the roller cutter 50 relative to the sleeve 54 once installed therein. The retaining ring may fit, along an inside diameter, within a groove disposed circumferentially around the second section 62, and fit along an outside diameter within a circumferential ridge disposed within the cylinder. In an example, the pocket has a diameter sized to provide a desired tolerance clearance between the cavity 64 and the second section 62 to permit rotational movement of the roller cutter 50. In an example embodiment, the tolerance is about 75 microns or more. The cavity 64 is cylindrical in shape, and the outside surface of the sleeve is configured for attaching with an end-use tool, e.g., a drill bit by welding process or the like.

Roller cutters as disclosed herein may be provided in at least in one of two different configurations according to different methods of making. In a first method, the extension provided for attachment with the infiltration substrate (during the single HPHT process or during a second HPHT process) is configured already having the first and second sections. In such example, the extension is preformed to have the first and second diameter sections prior to its attachment by HPHT processing. In such example, after the HPHT process is completed, the roller cutter is removed from the HPHT container and is essentially in a form ready for use, although there may me some minor post-formation cleanup to ensure the desired dimensions and clearances are provided. The first method is described in more detail below.

In a second method, the extension provided for attachment with the infiltration substrate (during the single HPHT process or during a second HPHT process) is configured having a single diameter, which is that of the first diameter section. In such example, the extension is preformed having a single diameter that is approximately the same as the infiltration substrate prior to HPHT attachment. After the HPHT attachment process is completed, the roller cutter is removed from the HPHT container and the extension is subjected to a subsequent machining process for purposes of forming the second section having a second diameter. While this second method may be more time consuming and labor intensive, it is a viable alternative method of making roller cutters as disclosed herein. The second method is described in more detail below.

Figure 5:
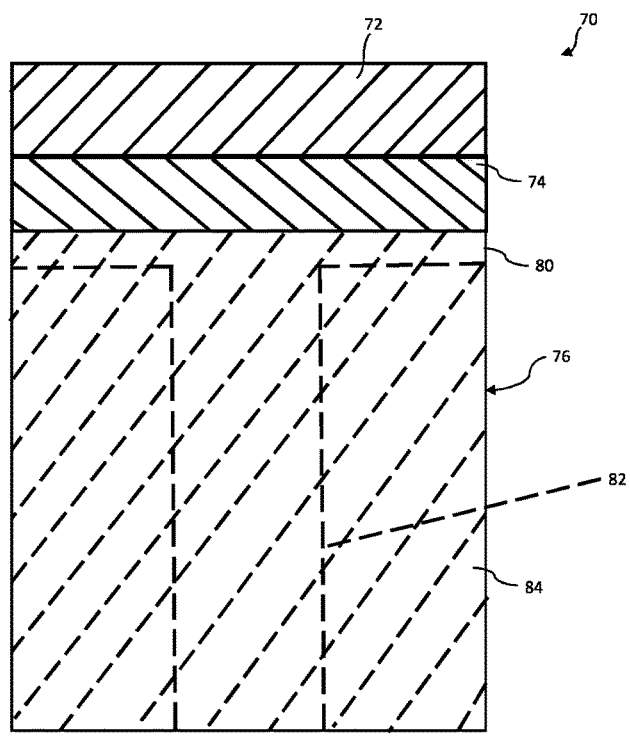
FIG. 5 is a cross-sectional side view of an example roller cutter made according to one method as disclosed herein.

FIG. 5 illustrates a roller cutter 70 formed according to the second method described above comprising a PCD body 52, an infiltration substrate 74 bonded to the PCD body, and an extension 76 bonded to the infiltration substrate 74 according to either of the single HPHT process used to sinter the PCD body or the second HPHT process used to attach the extension to the already-formed PCD body and compact. The extension 76 is illustrated as having a single constant diameter when removed from the HPHT device, which eventually becomes the first section 80. The second section 82, as shown in phantom lines and having a second diameter smaller than the first diameter, is formed after the roller cutter is removed from the HPHT device by removing excess material 84 by machining process or the like.

Roller cutters as disclosed herein may be formed according to the following methods. In a first method, the roller cutter is formed by loading a desired volume of diamond powder or a green-state diamond part into a desired container with the infiltration substrate positioned adjacent a surface of the diamond powder volume, and the extension positioned adjacent the infiltration substrate. In an example embodiment, both the infiltration substrate and the extension are provided and loaded into the container in the form of a solid or consolidated element. The container is positioned within a suitable HPHT consolidation and sintering device, and the device is operated to subject the container to a desired HPHT condition to consolidate and sinter the diamond powder, form an attachment bond between the infiltration substrate to the so-formed PCD body, and form an attachment bond between the infiltration substrate and the extension. In an example embodiment, the device is controlled so that the container is subjected to a HPHT process or cycle having a pressure of about 5,000 MPa or greater and a temperature of from about 1,350° C. to 1,500° C. for a predetermined period of time, which may be in the range of from about 1 to 15 minutes. At this pressure and temperature, the catalyst material within the infiltration substrate melts and infiltrates into the diamond powder mixture, thereby sintering the diamond grains to form PCD.

Diamond grains useful for forming the diamond-bonded body may include natural and/or synthetic diamond powders having an average diameter grain size in the range of from submicrometer in size to 100 micrometers, for example in the range of from about 1 to 80 micrometers. The diamond powder may contain grains having a mono or multi-modal size distribution. In an example embodiment, the diamond powder has an average particle grain size of approximately 20 micrometers. In the event that diamond powders are used having differently sized grains, the diamond grains are mixed together by conventional process, such as by ball or attritor milling for as much time as necessary to ensure good uniform distribution. The diamond grain powder may be cleaned, to enhance the sinterability of the powder by treatment at high temperature, in a vacuum or reducing atmosphere. The diamond powder mixture is loaded into a desired container for placement within a suitable HPHT consolidation and sintering device.

During the HPHT process, a catalyst material, e.g., a solvent metal catalyst or the like, is combined with the diamond powder. In an embodiment, the catalyst material is provided by infiltration from a desired substrate, i.e., an infiltration substrate, that is positioned adjacent the diamond powder prior to HPHT processing and that includes the catalyst material as a constituent material. Suitable substrates useful as a source of the catalyst material infiltrant may include those used to form conventional PCD materials, and may be provided in powder, green state and/or already sintered form. A feature of such substrate is that it includes a metal solvent catalyst that is capable of melting and infiltrating into the adjacent volume of the diamond powder to facilitate bonding the diamond grains together during the HPHT process. In an example embodiment, the catalyst material is Co, and a substrate useful for providing the same is a cobalt-containing carbide substrate, such as WC—Co.

A feature of roller cutters as disclosed herein is inclusion of both an infiltration substrate and an extension that are joined or bonded together during the same HPHT process used for sintering the diamond-bonded body, or during a subsequent HPHT process. In an embodiment, the infiltration substrate provides the source of catalyst material useful for sintering and forming the PCD body during the HPHT process. Accordingly, in an embodiment, such an infiltration substrate is specially engineered in terms of material composition and in terms of quantity, size and/or amount of the catalyst material as described above to provide this function. In an embodiment, the infiltration substrate is neither engineered for nor used to provide desired properties of improved strength and/or toughness to the portion of the roller cutter that engages with the drilling tool pocket or cavity, which properties (in addition to providing a rotatable attachment with a pocket), are provided by the extension.

In an example embodiment, where the diamond powder volume is about 0.5 cc, the Co volume from the infiltration substrate material may be in the range of from about 0.15 to 0.25 ml. It is understood that these amounts are provided for purposes of reference and example, and that the exact amount of infiltration substrate material that is used can and will vary depending such factors as the volume of the diamond powder, the desired diamond content of the resulting PCD body, and/or the volume content of the catalyst material in the infiltration substrate. Alternatively, in an example embodiment of a roller cutter where the PCD body has a diameter of approximately 16 mm, and a thickness of approximately 2.5 mm, the infiltration substrate may have the same diameter and an axial thickness in the range of from about 0.7 to 1.2 mm. In an embodiment, the infiltration substrate has a thickness no greater than about ½ the thickness of the PCD body, and in some cases less than about ¼ the thickness of the PCD body.

While the infiltration substrate has been described as providing the source of catalyst material for infiltration and sintering of the PCD body, the infiltration substrate may alternatively have a level of catalyst material, e.g., cobalt, insufficient by itself to provide a desired level of infiltration and sintering. In such example, the infiltration substrate may comprise a lower level of the catalyst material than disclosed above, and act as a sieve through which a catalyst material migrates therethrough and into the diamond powder from the underlying extension during the sintering process.

In an example embodiment, the extension is engineered having a material composition capable of providing an improved degree of strength and/or toughness when compared to conventional roller cutter constructions, and when compared to the infiltration substrate. In an example embodiment, such enhanced strength and/or toughness may be provided from a material construction comprising an increased proportion of the binder phase material, and/or a reduced proportion of the hard phase material when compared to the composition of the infiltration substrate. For example, when the extension is formed from a carbide material such as WC—Co, such WC—Co may comprise about 8 percent by weight or more Co, for example, 9 to 25 percent by weight Co, or about 10 to 20 percent by weight Co based on the total weight of the WC—Co. In an example embodiment, the extension is formed using a carbide material comprising approximately 10 percent by weight cobalt. In an example where a high degree of roller cutter extension toughness is desired, such may be achieved by using a relatively higher amount of Co and relatively coarse WC grains.

In an example embodiment, it is desired that the extension be formed from a material composition that operates to reduce residual stress resulting from the HPHT process and bonding together with the infiltration substrate. In an example, such desired reduction of residual stress can be achieved from a material construction having a relatively small hard phase average particle or grain size. In an example, where the extension is formed from a carbide material such as WC—Co, the hard phase WC may have an average grain size of less than about 8 microns, for example in the range from about 0.25 to 5 microns, or from about 0.5 to 2 microns. In an example where a high degree of roller cutter extension strength is desired, such may be achieved by using relative fine WC grain sizes. In a particular example, a high level of roller cutter extension strength is achieved by using a WC—Co material comprising an average WC grain size of between about 0.5 and 1 microns, and comprising approximately 10 percent by weight Co.

Figure 7:
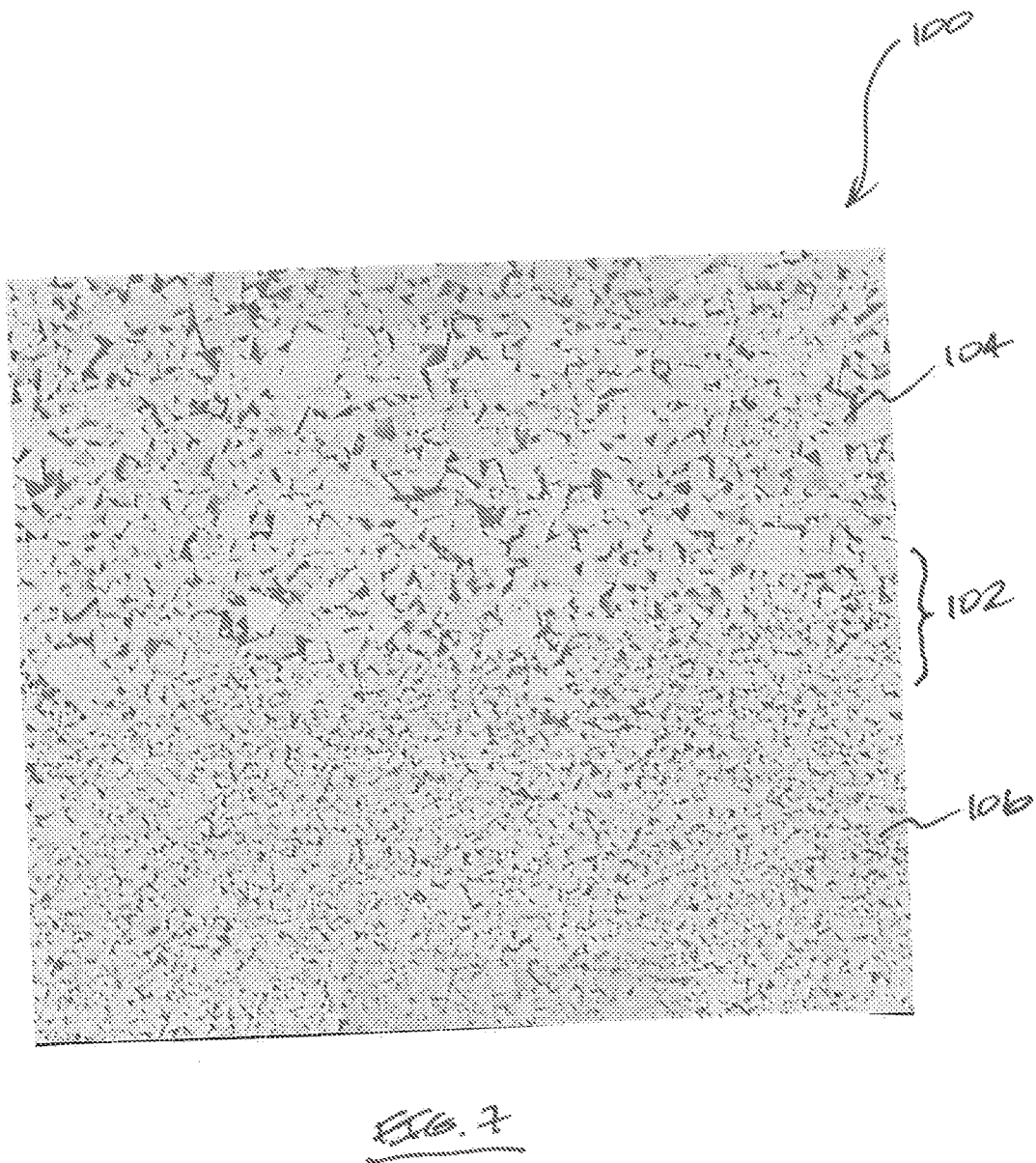
FIG. 7 is a photomicrograph of a region of a roller cutting element as disclosed herein.

In an example embodiment, it is desired that the extension provide both a desired increase in strength and/or toughness as well as a reduced amount of residual stress at or adjacent to the interface between the extension and the infiltration substrate, in which case the extension when formed from WC—Co comprises a material composition comprising a combination of the binder material phase content and hard grain average particle size as disclosed above. FIG. 7 is a photomicrograph illustrating a section 100 of the roller cutter capturing the material microstructure at and adjacent to an interface region 102 between the infiltration substrate 104 and the extension 106. In this example, both the infiltration substrate and the extension were formed from WC—Co having the properties (Co content and WC grain size) noted above and that were joined together during a HPHT process, e.g., used to sinter the diamond-bonded body. As illustrated, the interface between the infiltration substrate and the extension contains few, if any, defects, and such interface displayed minimal residual stress as both carbides solidified and shrunk during cooling under great pressure.

Extensions used with roller cutters as disclosed herein, comprising the material composition described above, may not be well suited for use in conventional cutting element applications, such as those where the substrate is attached to a drilling tool in a manner that leaves it exposed to drilling debris and fluid known to produce a highly erosive environment. Extensions formed in the manner disclosed above, from a material comprising relatively small sized hard grain particles and relatively high binder phase material content may be susceptible to erosion wear if placed in such end-use applications that would ultimately shorten the effective service life of the cutting element. Accordingly, the extensions as disclosed herein are specially engineered to provide properties of toughness and/or strength that are uniquely suited for use with a roller cutter in adapting the same to provide an improved service life when placed into such end-use application. Additionally, extensions as disclosed herein are also specially engineering to provide a strong bond with the infiltration substrate with a reduced residual stress to thereby also enhance effective service life.

Continuing discussion of the first method of manufacture, after the HPHT process is completed, the container is removed from the HPHT device, and the so-formed roller cutter construction is removed from the container. A feature of roller cutters made according to this example method is that the infiltration substrate and the extension are attached to one another, and the infiltration substrate is attached to the PCD body, during the same single HPHT process used to sinter or form the PCD body, thereby avoiding the need for any subsequent attaching step, e.g., by braze or welding operation. Further, because of the material composition of the extension, the attachment bond formed between the extension and infiltration substrate is one characterized by a reduced or zero residual stress along the interface, and one having a bond that is flawless (as illustrated in FIG. 7).

In a second method of formation, the roller cutter is formed in the same manner disclosed above, except that the extension is not present in the HTHP sintering assembly and only the infiltration substrate is positioned adjacent the diamond volume to be sintered. The construction resulting from the HPHT process is a compact comprising the sintered PCD body that is attached to the infiltration substrate. According to this second method, the extension is attached during a subsequent HPHT process or cycle that is separate from the one used to form the compact. Once the compact is formed and removed from the container it is loaded in another container along with the extension, wherein the extension is positioned adjacent the infiltration substrate. The assembly is loaded into a HPHT device and is subjected to a second HPHT process or cycle. In an example, the second HPHT process is one that is operated at a temperature, pressure and/or duration sufficient to enable the extension to join with the infiltration substrate, e.g., by carbide bonding or carbide fusion.

In an example embodiment, the second HPHT cycle used to bond the extension to the infiltration substrate is operated at a temperature that is generally less that that used to form the compact, and may be in the range of from about 1,300 to 1,550° C., at a pressure that is generally less than that used to form the compact, and may be in the range of from about 4,500 to 5,500 MPa, and for a duration that is generally less than that used to form the compact, and may be in the range of from about 1 to 10 minutes. In a specific example, the second HPHT cycle is operated at approximately 1,350° C., approximately 5,000 MPa, for approximately 1.5 minutes.

Interface surfaces between the PCD body and the infiltration substrate and/or between the infiltration substrate and the extension may be planar or nonplanar. In an end-use application calling for a high degree of delamination resistance, a nonplanar interface may be desired to provide an enhanced degree of attachment strength between the infiltration substrate and the extension. A construction comprising nonplanar interfaces both between the diamond body and the infiltration substrate and between the initial substrate and the extension substrate may provide a further degree of enhanced resistance against unwanted delamination during use.

If desired, the diamond-bonded body may be treated to remove at least a portion of the catalyst material disposed therein, thereby providing a resulting diamond body having improved properties of thermal stability, i.e., having a TSP portion. The particular end-use application will influence the extent and location of catalyst material removed from the diamond bonded body. The term "removed", as used with reference to the catalyst material is understood to mean that a substantial portion of the catalyst material no longer resides within the treated region of the diamond body. However, it is to be understood that some small amount of catalyst material may still remain in the part, e.g., within the interstitial regions and/or adhered to the surface of the diamond crystals. Additionally, the term "substantially free", as used herein to refer to the catalyst material in the treated region of the diamond body, is understood to mean that there may still be some small/trace amount of catalyst material remaining within the treated diamond body as noted above.

In an example embodiment, the diamond-bonded body may be treated to remove catalyst material by chemical treatment, such as by acid leaching or aqua regia bath, electrochemical treatment such as by electrolytic process, by liquid metal solubility, or by liquid metal infiltration that sweeps the existing catalyst material away and replaces it with another noncatalyst material during a liquid phase sintering process, or by combinations thereof. In an example embodiment, the catalyst material is removed from the diamond body by an acid leaching technique. Accelerated catalyst removal techniques may be used that involved elevated temperature and/or elevated pressure and/or sonic energy and the like. The diamond bonded body may be subjected to such treatment before or after it is attached to the final substrate.

The treated region of the diamond-bonded body comprises a material microstructure having a polycrystalline diamond matrix phase made up of a plurality of diamond grains or crystals that are bonded together, and a plurality of interstitial regions that are disposed between the matrix phase of bonded together diamond grains, and that exist as empty pores or voids within the material microstructure, as a result of the catalyst material being removed therefrom.

In an example embodiment, only a partial region of the diamond body is treated and the treated region extends a desired depth from a surface, which may be a working surface or the bonding surface to the substrate, of the diamond-bonded body. In an example embodiment, the depth of such treated region may be about 0.05 mm or less, or may be about 0.05 to 0.6 mm. The exact depth of the treated region will depend on the bonding process and/or end-use application.

If desired, the treated region of the diamond-bonded body may be further treated so that all or a population of the interstitial regions within the part, previously empty by virtue of removing the catalyst material therefrom, are filled with a desired replacement or infiltrant material. In an example embodiment, such region may be filled, backfilled or reinfiltrated with a material that operates to minimize and/or eliminate unwanted infiltration of material from the final substrate, and/or that operates to improve one or more properties of the diamond-bonded body.

Example replacement or infiltrant materials useful for treating the diamond-bonded body may include materials selected from the group including metals, metal alloys, metal carbonates, carbide formers, i.e., materials useful for forming a carbide reaction product with the diamond in the body, and combinations thereof. Example metals and metal alloys include those selected from Group VIII of the Periodic table, examples carbide formers include those comprising Si, Ti, B, and others known to produce a carbide reaction product when combined with diamond at HPHT conditions. The infiltrant material may have a melting temperature that is within the diamond stable HPHT window, and may be provided in the form of a powder layer, a green state part, an already sintered part, or a preformed film. The diamond bonded body may be infiltrated during a further HPHT process.

If desired, roller cutters as disclosed herein may be subjected to a surface treatment for purposes of increasing the static and/or cyclic strength. In an example, the working surface of the body may be subjected to a treatment such as shot peening or the like that is a work hardening process that operates to introduce compressive stress into the surface region being treated. Such surface treatment may also be carried out on other areas of the roller cutter where a desired increased surface strength, and related increase in load bearing capability, is desired. Such shot peening may be carried out using tungsten carbide beads directed to the desired surface of the roller cutter at high velocity through a nozzle or the like.

A feature of roller cutters as disclosed herein is that they make use of an infiltration substrate, which supplies catalyzing material for diamond sintering to form the PCD body, and further comprise an extension that is specially configured and that has a specific material composition designed to provide properties of improved bond strength, low residual stress, and improved properties of toughness and/or strength when placed into an end-use application. Specifically, roller cutters as disclosed herein comprise an extension having an interface area that is the same as the infiltration substrate to ensure a strong bond attachment therewith, having a material composition that minimize residual stress at or near the interface with the infiltration substrate, and that has a second diameter section that is integral with the extension to facilitate placement within a pocket or sleeve to enable rotational movement during use. Engineered in this manner, such roller cutters function to provide an enhanced degree of service life when compared to conventional roller cutters. Further, roller cutters as disclosed herein having the extension attached to the infiltration substrate during an HPHT process avoids the need for brazing or welding the extension to the compact, thereby also eliminating a source known to introduce residual stress into the construction, which residual stress may cause premature failure and reduced roller cutter service life.

Roller cutters as disclosed herein may be used in a number of different applications, such as tools for mining, cutting, machining, milling and construction applications, wherein properties of shear strength, thermal stability, wear and abrasion resistance, mechanical strength, and/or reduced thermal residual stress are highly desired. Such roller cutters are particularly well suited for forming working, wear and/or cutting elements in machine tools and drill and mining bits used in subterranean drilling applications.

Figure 6:
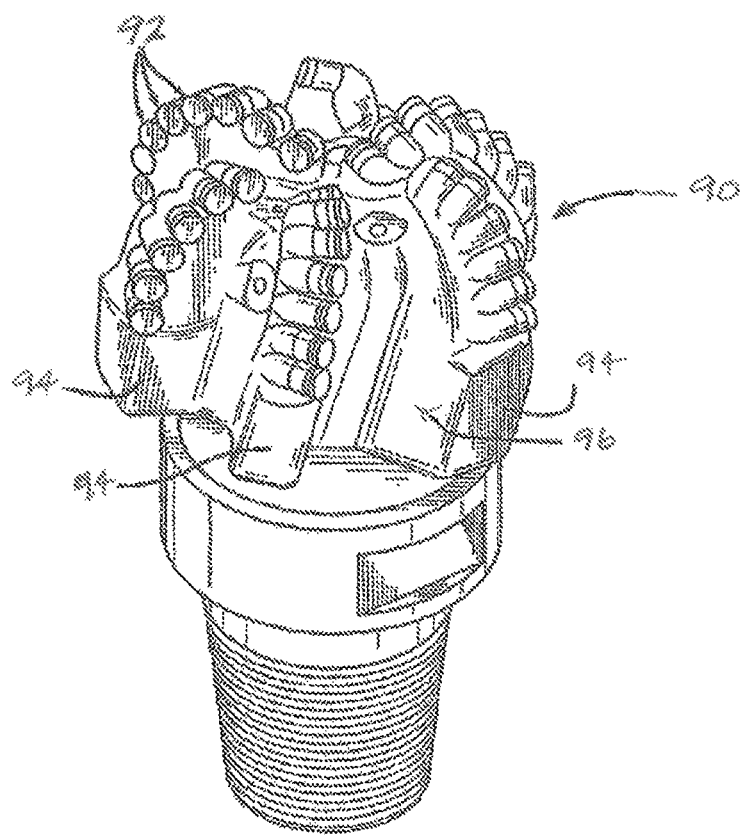
FIG. 6 is a perspective view of a drag bit comprising a number of the rolling cutting elements.

FIG. 6 illustrates a drag bit 90 comprising a plurality of the roller cutters 92 as disclosed herein attached thereto by the housing (illustrated in FIG. 4) to enable rotational movement of the roller cutter during operation of the bit. The roller cutters are each attached to blades 94 that each extend from a head 96 of the drag bit for engaging and cutting against the subterranean formation being drilled.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A roller cutting element comprising:
    a diamond-body comprising a matrix phase of intercrystalline bonded diamond, and a plurality of interstitial regions dispersed within the matrix phase;
    an infiltration substrate having a first diameter attached to the diamond body;
    an extension attached to the infiltration substrate, the extension having a first section having the first diameter and a second section having a second diameter less than the first diameter, wherein the first section is attached to the infiltration substrate, and wherein the second section is integral with the first section; and
    a sleeve including a cavity accommodating the second section of the extension therein, the cavity having an opening that is adjacent the first section of the extension.

2. The roller cutting element as recited in claim 1 wherein the infiltration substrate and the extension are selected from the group consisting of metallic materials, ceramic materials, cermet materials, and combinations of the same, wherein the extension and the infiltration substrate each comprise a hard phase material, and wherein the hard phase material in the extension has an average grain size that is less than the average grain size of the hard phase material in the infiltration substrate.

3. The roller cutting element as recited in claim 1 wherein the thickness of the first section of the extension is greater than the thickness of the infiltration substrate.

4. The roller cutting element as recited in claim 1 wherein the axial length of the second section is greater than a combined thickness of the infiltration substrate and the first section.

5. The roller cutting element as recited in claim 1 wherein the infiltration substrate and the extension each comprises a binder phase material, and wherein the weight percent of binder phase material in the extension is the same or more than the weight percent binder phase material in the infiltration substrate.

6. The roller cutting element as recited in claim 1 wherein the strength of the extension is greater than the strength of the infiltration substrate.

7. The roller cutting element as recited in claim 1 wherein the infiltration substrate and the extension are each formed from WC-Co.

8. A bit for drilling subterranean formations comprising a body and a number of the roller cutting elements as recited in claim 1 coupled thereto, wherein the roller cutting element extension is rotatably mounted within a cavity in the surface of the bit.

9. A bit for drilling subterranean formations comprising:
    a bit body having a number of blades extending outwardly therefrom;
    a plurality of roller cutters coupled to the blades, each roller cutter comprising:
    a PCD body;
    an infiltration substrate having a first diameter attached to the PCD body and formed from WC-Co; and
    an extension formed from WC-Co and comprising a first section having the first diameter and a second section having a second diameter less than the first diameter, wherein the first section is attached to the infiltration substrate along an interface, and wherein the second section extends from the first section; and
    a plurality of cavities within the blade, wherein each of the plurality of roller cutters is rotatably mounted within one of the cavities so as to provide rotatable movement of each of the roller cutters during operation of the bit.

10. The bit as recited in claim 9, wherein each of the roller cutters further comprises:
    a sleeve comprising an inner cavity, wherein the second section of the extension is rotatably mounted within the inner cavity, and wherein the sleeve is coupled to the blade within one of the plurality of cavities.

11. The bit as recited in claim 9 wherein the thickness of the first section of the extension is greater than the thickness of the infiltration substrate.

12. The bit as recited in claim 9 wherein the average grain size of the WC in the extension is less than the average grain size of the WC in the infiltration substrate.

13. The bit as recited in claim 9 wherein the Co content in the extension is the same or greater than the Co content in the infiltration substrate.

14. The bit as recited in claim 9 wherein the average grain size of the WC in the extension is less than the average grain size of the WC in the infiltration substrate, and wherein the Co content in the extension is the same or greater than the Co content in the infiltration substrate.

15. The bit as recited in claim 9 wherein the strength of the extension is greater than the strength of the infiltration substrate.

16. A method for making a roller cutter comprising the steps of:
    forming a sintered diamond-bonded body by exposing a volume of diamond grains to a high-pressure/high-temperature condition in the presence of a catalyst material provided by an infiltration substrate positioned adjacent to the volume of diamond grains;
    attaching the infiltration substrate to the diamond-bonded body during the high-pressure/high temperature condition; and
    attaching an extension to the infiltration substrate, wherein the extension is attached to the infiltration substrate along an interface of the extension having a diameter that is the same as the infiltration substrate, wherein both the infiltration substrate and the extension have a hard phase material, and wherein hard phase material in the extension has an average grain size that is less than the average grain size of the hard phase material in the infiltration substrate.

17. The method as recited in claim 16 wherein the extension comprises a second section positioned away from the interface that is an integral part of the extension and that has a diameter smaller than that of the interface, and wherein the extension has a property of strength or toughness that is greater than that of the infiltration substrate.

18. The method as recited in claim 16 further comprising, after the step of forming, removing material from a portion of the extension to form a second section that is positioned a distance from the interface and that has a diameter sized smaller that the extension interface.

19. The method as recited in claim 16 wherein the extension is attached during a high-pressure/high-temperature condition that is different from the high-pressure/high-temperature condition used to form the sintered diamond body.

* * * * *